US005396044A

United States Patent [19]

Orlowski et al.

[11] Patent Number: 5,396,044

[45] Date of Patent: Mar. 7, 1995

[54] METHOD OF MAKING A FIBRILLATED PULTRUDED ELECTRONIC COMPONENT USING A LASER BEAM

[75] Inventors: Thomas E. Orlowski, Fairport; Joseph A. Swift, Ontario; Stanley J. Wallace, Victor; Wilbur M. Peck, Rochester; John E. Courtney, Macedon; David E. Rollins, Lyons, all of N.Y.

[73] Assignee: Xerox Corporation, Stamford, Conn.

[21] Appl. No.: 122,083

[22] Filed: Sep. 17, 1993

Related U.S. Application Data

[60] Division of Ser. No. 806,062, Dec. 11, 1991, Pat. No. 5,270,106, which is a continuation-in-part of Ser. No. 516,000, Apr. 16, 1990, abandoned.

[51] Int. Cl.[6] .............................................. B23K 26/00

[52] U.S. Cl. ................................................. 219/121.66

[58] Field of Search ...................... 219/121.67, 121.72, 219/121.65, 121.66; 29/825; 174/119 R

[56] References Cited

U.S. PATENT DOCUMENTS 5,250,756 10/1993 Swift et al. .................... 174/119 R
5,282,310 2/1994 Rommelmann et al. ............ 25/825

*Primary Examiner*—Geoffrey S. Evans

[57] ABSTRACT

A method of making a connector by applying a focused beam from a laser to a polymer matrix containing plurality of conductive fibers in parallel. The laser is applied at one end of the matrix to volatilize the matrix so as to expose the plurality of conductive fibers to provide a laser fibrillated brush-like structure to define an electrically contacting surface.

24 Claims, 3 Drawing Sheets

FIG. 1A
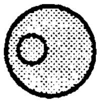
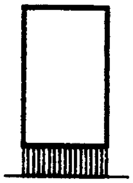
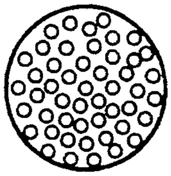
FIG. 1B
FIG. 1
FIG. 2A
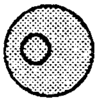
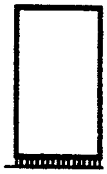
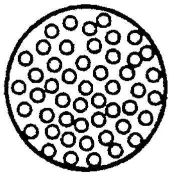
FIG. 2
FIG. 2B
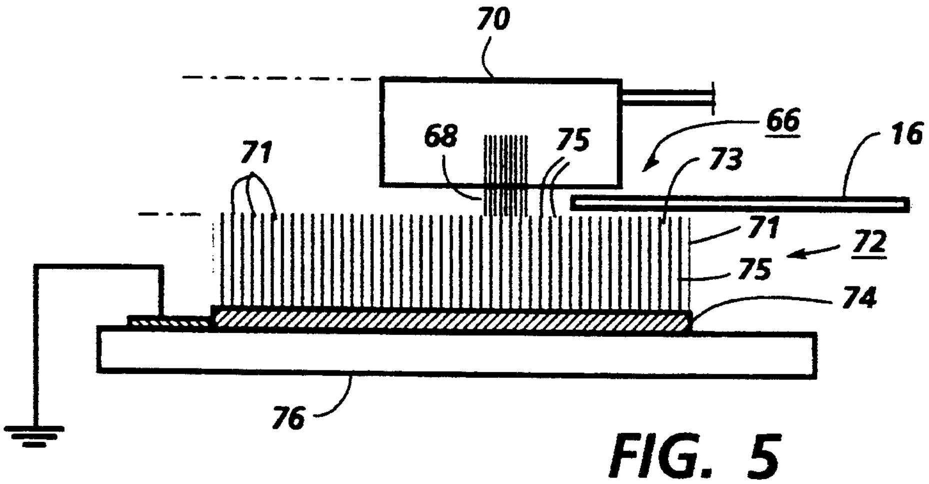
FIG. 5
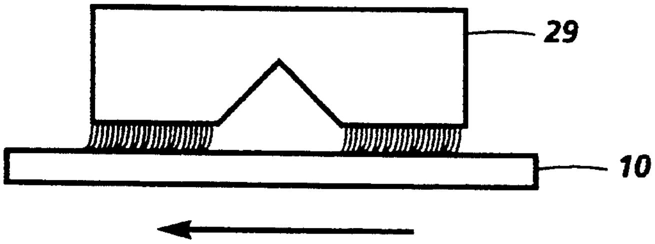
FIG. 6

METHOD OF MAKING A FIBRILLATED PULTRUDED ELECTRONIC COMPONENT USING A LASER BEAM

The application is a divisional of Ser. No. 07/806,062, filed Dec. 11, 1991, now U.S. Pat. No. 5,270,106, which is a continuation-in-part of Ser. No. 07/516,000, filed Apr. 16, 1990, now abandoned.

CROSS REFERENCE TO RELATED APPLICATIONS

Attention is directed to U.S. application Ser. No. 07/272,280, filed Nov. 17, 1988, now abandoned, in the name of Swift et al. and entitled "Pultruded Electrical Device" and a continuation in part thereof, U.S. Pat. No. 5,139,862. Attention is also directed to co-pending U.S. application Ser. No. 071276,835 entitled "Machine With Removable Unit Having Two Element Electrical Connection" in the name of Ross E. Schroll et al. filed Nov. 25, 1988, now U.S. Pat. No. 5,177,259. Both of the above applications are commonly assigned to the assignee of the present invention.

BACKGROUND OF THE PRESENT INVENTION

The present invention relates generally to electronic components such as connectors, switches and sensors for conducting electrical current. In particular, it relates to such components useful in various types of machines and other applications which require electronic devices for their proper operation. More specifically, the electronic component is a pultruded composite member having a plurality of small generally circular cross section conductive fibers in a polymer matrix where the fibers are oriented in a direction parallel to the axial direction of the member and are continuous from one end of the member to the other with one end of the member having a fibrillated brush-like structure. The devices described herein are particularly well suited for low energy electronic/micro electronic signal level circuitry typified by contemporary digital and analog signal processing practices. Typical of the type of machines which may use such electronic devices are electrostatographic printing machines.

In electrostatographic printing apparatus commonly used today a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image contained within the original document. Alternatively, a light beam may be modulated and used to selectively discharge portions of the charged photoconductive surface to record the desired information thereon. Typically, such a system employs a laser beam. Subsequently, the electrostatic latent image on the photoconductive insulating surface is made visible by developing the image with developer powder referred to in the art as toner. Most development systems employ developer which comprises both charged carrier particles and charged toner particles which triboelectrically adhere to the carrier particles. During development the toner particles are attracted from the carrier particles by the charged pattern of the image areas of the. photoconductive insulating area to form a powder image on the photoconductive area. This toner image may be subsequently transferred to a support surface such as copy paper to which it may be permanently affixed by heating or by the application of pressure.

In commercial applications of such products, the photoconductive member has typically been configured in the form of a belt or drum moving at high speed in order to permit high speed multiple copying from an original document. Under these circumstances, the moving photoconductive member must be electrically grounded to provide a path to ground for all the spurious currents generated in the xerographic process. This has typically taken the form of a ground strip on one side of the photoconductive belt or drum which is in contact with a grounding brush made of conductive fibers. Some brushes suffer from a deficiency in that the fibers are thin in diameter and brittle and therefore the brushes tend to shed which can cause a problem in particular with regard to high voltage charging devices in automatic reproducing machines in that if a shed conductive fiber comes in contact with the charging wire it has a tendency to arc causing a hot spot on the wire resulting in melting of the wire and breaking of the corotron. This is destructive irreversible damage requiring unscheduled service on the machine by a trained operator. Also, the fiber can contaminate the device and disrupt uniformity of the corona charging.

Furthermore, in commercial applications of such products it is necessary to distribute power and/or logic signals to various sites within the machine. Traditionally, this has taken the form of utilizing conventional wires and wiring harnesses in each machine to distribute power and logic signals to the various functional elements in an automated machine. In such distribution systems, it is necessary to provide electrical connectors between the wires and components. In addition, it is necessary to provide sensors and switches, for example, to sense the location of copy sheets, documents, etc. Similarly, other electrical devices such as interlocks, etc. are provided to enable or disable a function.

The most common devices performing these functions have traditionally relied on metal-to-metal contacts to complete the associated electronic circuit. While this long time conventional approach has been very effective in many applications, it nevertheless suffers from several difficulties. For example, one or both of the metal contacts may be degraded over time by the formation of an insulating film due to oxidation of the metal. This film may not be capable of being pierced by the mechanical contact forces or by the low energy (5 volts and 10 milliamps) power present in the circuit. This is complicated by the fact that according to Holm, Electric Contacts, page 1, 4th Edition, 1967, published by Springer-Verlag, no amount of force if the contacts are infinitely hard can force contact to occur in more than a few localized spots. Further, corroded contacts can be the cause of radio frequency interference (noise) which may disturb sensitive circuitry. In addition, the conventional metal to metal contacts are susceptible to contamination by dust and other debris in the machine environment. In an electrostatographic printing machine, for example, toner particles are generally airborne within the machine and may collect and deposit on one or more such contacts. Another common contaminant in a printing machine is a silicone oil which is commonly used as a fuser release agent. This contamination may also be sufficient to inhibit the necessary metal-to-metal contact. Accordingly, the direct metal-to-metal contact suffers from low reliability particularly in low energy circuits. To improve the reliability of such contacts, particularly for low energy applications, contacts have been previously made from such noble metals as gold, palladium, silver and rhodium or specially developed alloys such as palladium nickel while for some applications contacts have been placed in a vacuum or hermetically sealed. In addition, metal contacts can be self-destructive and will burn out since most metals have a positive coefficient of thermal conductivity and as the contact spot gets hot due to increasing current densities it becomes more resistive thereby becoming hotter with the passage of additional current and may eventually burn or weld. Final failure may follow when the phenomena of current crowding predominates the conduction of current. In addition to being unreliable as a result of susceptibility to contamination, traditional metal contacts and particularly sliding contacts owing to high normal forces are also susceptible to wear over long periods of time.

PRIOR ART

U.S. Pat. No. 4,347,287 to Lewis et al. describes a system for forming a segmented pultruded shape in which a continuous length of fiber reinforcements are impregnated with a resin matrix material and then formed into a continuous series of alternating rigid segments and flexible segments by curing the matrix material impregnating the rigid sections and removing the matrix material impregnating the flexible sections. The matrix material is a thermosetting resin and the fiber reinforcement may be glass, graphite, boron or aramid fibers.

U.S. Pat. No. 4,358,699 to Wilsdorf is an abundant disclosure of electrical fiber brushes which is focused by the examples on metal fibers in a metallic matrix used in high energy rather than low energy applications. Structurally, extremely small diameter metallic fibers are embedded in other fibers which may be embedded in still other fibers all held in a matrix which enables high current densities and conduction with minimal power losses by quantum mechanical tunneling.

U.S. Pat. No. 4,641,949 to Wallace et al. describes a conductive brush paper position sensor wherein the brush fibers are conductive fibers made from polyacrylonitrile, each fiber acting as a separate electrical path through which the circuit is completed.

U.S. Pat. No. 4,569,786 to Deguchi discloses an electrically conductive thermoplastic resin composition containing metal and carbon fibers. The composition can be converted into a desired shaped product by injection molding or extrusion molding (see col. 3, lines 30–52).

U.S. Pat. No. 4,553,191 to Franks et al. describes a static eliminator device having a plurality of resilient flexible thin fibers having a resistivity of from about $2\times10^3$ ohm-cm to $1\times10^6$ ohm-cm. Preferably, the fibers are made of a partially carbonized polyacrylonitrile fiber.

U.S. Pat. No. 4,369,423 to Holtzberg describes a composite automobile ignition cable which has an electrically conductive core comprising a plurality of mechanically and electrically continuous filaments such as graphitized polyacrylonitrile and electrically insulating elastomeric jacket which surrounds and envelopes the filaments.

U.S. Pat. No. 4,761,709 to Ewing et al. describes a contact brush charging device having a plurality of resiliently flexible thin fibers having a resistivity of from about $10^2$ ohms-cm to about $10^6$ ohm-cm which are substantially resistivity stable to changes in relative humidity and temperature. Preferably the fibers are made of a partially carbonized polyacrylonitrile fiber.

U.S. Pat. No. 4,344,698 to Ziehm discloses grounding a photoconductive member of an electrophotographic apparatus with a member having an incising edge.

U.S. Pat. No. 4,841,099 to Epstein et al. discloses an electrical component made from an electrically insulating polymer matrix filled with electrically insulating fibrous filler which is capable of heat conversion to electrically conducting fibrous filler and has at least one continuous electrically conductive path formed in the matrix by the in situ heat conversion of the electrically insulating fibrous filler.

Electric Contacts by Ragnar Holm, 4th Edition, published by Springer-Verlay, 1967, pages 1–53, 118–134, 228, 259 is a comprehensive description of the theory of electrical contacts, particularly metal contacts.

SUMMARY OF THE INVENTION

The present invention is directed to an electronic component for making electrical contact with another component comprising a nonmetallic pultruded composite member having a plurality of small generally circular cross section conductive fibers in a polymer matrix, the fibers being oriented in the matrix in the direction substantially parallel to the axial direction of the member and being continuous from one end of the member to the other to provide a plurality of electrical point contacts at each end of the member with one end of the member having a fibrillated brush-like structure of the plurality of fibers providing a densely distributed filament contact wherein the terminating ends of the fibers in the brush-like structure define an electrically contacting surface. Typically the electronic component is present in an electronic device such as a switch, sensor or connector.

in a further aspect of the present invention, the fibers of the brush-like structure have a substantially uniform free-fiber length and there is a well defined controlled zone of demarcation between the pultruded portion and the brush-like structure.

In a further aspect of the present invention, the fibers in the brush-like structure have a length greater than five times the fiber diameter and are resiliently flexible behaving elastically as a mass when deformed.

In a further aspect of the present invention, the fibers in the brush-like structure have a length shorter than five times the fiber diameter and the terminating ends provide a relatively rigid contacting surface.

In a further aspect of the present invention, the conductive fibers are carbon fibers preferably carbonized polyacrylonitrile fibers.

In a further aspect of the present invention, the fibers are generally circular in cross section and have a diameter of from about 4 micrometers to about 50 micrometers and preferably from about 7 micrometers to about 10 micrometers.

In a further aspect of the present invention, the fibers have DC volume resistivities of from about $1\times10^{-5}$ to about $1\times10^{10}$ ohm-cm and preferably from about $1\times10^{-4}$ to about 10 ohm-cm.

In a further aspect of the present invention, the fibers are present in the pultruded component in an amount of from about 5% to about 90% by weight, and preferably at least 50% by weight.

In a further aspect of the present invention, the polymer matrix is a thermoplastic or thermosetting resin and is preferably a polyester or a vinylester.

In a further principle aspect of the present invention, the pultruded member is a mechanical member as well as an electrical component.

In a further aspect of the present invention, the pultruded member may have at least one mechanical feature incorporated therein.

In a further aspect of the present invention the component is used in an electronic device in low energy circuits having currents in the micro to milliamp range and voltages in the range of millivolts to hundreds of volts.

A further principle aspect of the present invention is directed to a method of making the electrical component wherein the pultruded composite member has a laser beam directed to one end of the member which is controlled to volatilize the polymer matrix at the one end and expose the plurality of conductive fibers to provide a laser fibrillated brush-like structure.

In a further aspect of the present invention, the pultruded member is an elongated member and the laser beam is controlled to cut through the pultruded member adjacent to one end.

In a further aspect of the present invention, the laser beam is controlled to simultaneously cut the pultrusion and volatilize the polymer matrix.

In a further aspect of the present invention, the electrical component is used to provide an electrically conductive grounding brush for a moving photoconductive member in an electrostatographic printing machine.

BRIEF DESCRIPTION OF THE DRAWINGS

The invention is illustrated with reference to the following representative figures in which the dimensions of parts are not necessarily to scale but rather may be exaggerated or distorted for clarity of illustration and case of description.

FIG. 1 is a side view illustrating a pultruded composite member which has had the polymer matrix removed from one end to expose the individual fibers which are each relatively long compared to the fiber diameter and will behave as brush like mass when deformed.

FIG. 1A is a view of the cross section of the fibrillated member in FIG. 1.

FIG. 1B is a further enlarged magnified view of a portion of the cross section in FIG. 1A.

FIG. 2 illustrates an additional embodiment in cross section of a pultruded member wherein one end has been fibrillated to only a very short length compared to the fiber diameter and the terminating ends provide a relatively rigid contacting surface.

FIG. 2A is a view of the cross section of the fibrillated member in FIG. 2.

FIG. 2B is a further enlarged magnified view of a portion of the cross section in FIG. 1A.

FIG. 5 is a representation of a sensor having a laser fibrillated pultruded contact and a pultruded contact.

FIG. 6 is an enlarged view from the side of a photoconductor grounding brush in contact with a moving photoconductor surface.

DETAILED DESCRIPTION OF THE INVENTION

Figure 3:
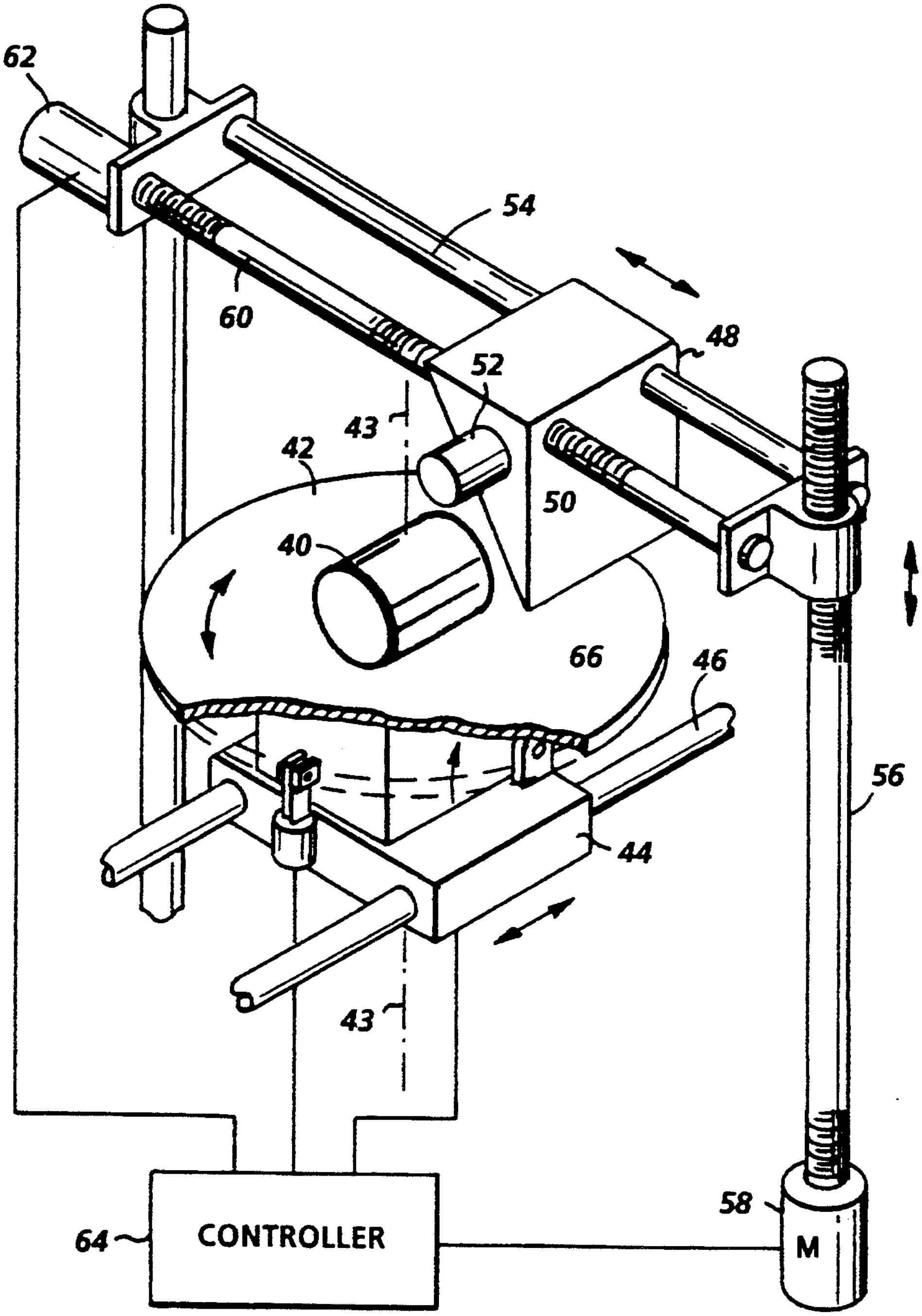
FIG. 3 is a schematic illustration of a programmable bed upon which a pultruded member may be placed to have a portion thereof laser fibrillated.

In accordance with the present invention, an electronic component is provided and a variety of electronic devices for conducting electrical current such as switches, sensors, connectors, interlocks, etc. are provided which are of greatly improved reliability, are of low cost and easily manufacturable and are capable of reliably operating in low energy circuits. Typically these devices are low energy devices, using low voltages within the range of millivolts to hundreds of volts and currents within the range of microamps to hundreds of milliamps as opposed to power applications of tens to hundreds of amperes, for example. Although the present invention may be used in certain applications in the single amp region it is noted that best results are obtained in high resistance circuitry where power losses can be tolerated. It is also noted that these devices may be used in certain applications in the high voltage region in excess of 10,000 volts, for example, where excessive heat is not generated. These devices are generally electronic in nature within the generic field of electrical devices meaning that their principle applications are in signal level circuits although as previously stated they may be used in certain low power applications where their inherent power losses may be tolerated. Furthermore, it is possible for these electronic devices in addition to performing an electrical function to provide a mechanical or structural function. The above advantages are enabled through the use of a manufacturing process known generally as pultrusion and the fibrillation of at least one end of the pultrusion.

According to the present invention, an electronic component is made from a pultruded composite member having a fibrillated brush-like structure at one end which provides a densely distributed filament contact with another component. By the term densely distributed filament contact it is intended to define an extremely high level of contact redundancy insuring electrical contact with another contact surface in that the contacting component has in excess of 1000 individual conductive fibers per square millimeter. In a preferred embodiment, with the use of a laser, the pultruded member can be cut into individual segments and fibrillated in a one step process. The laser fibrillation provides a quick, clean programmable process producing an electronic contact which is of low cost, long life, produces low electrical noise, doesn't shed and can be machined like a solid material and yet provide a long wearing, easily replaceable noncontaminating conductive contact. On the one hand, it has the capability of producing an electronic contact wherein the brush-like structure has a length many times greater than the diameter of the individual fibers and thereby provides a soft resiliently flexible brush which behaves elastically as a mass when it is deformed thereby providing the desired level of redundancy in the electronic contact. It also has the advantage of providing a micro-like structure wherein the brush-like fibers have a length much shorter than five times the diameter of the fibers and the terminating ends provide a relatively rigid contacting surface.

The pultrusion process generally consists of pulling continuous lengths of fibers through a resin bath or impregnator and then into a preforming fixture where the section is partially shaped and excess resin and/or air are removed and then into heated dies where the section is cured continuously. Typically, the process is used to make fiberglass reinforced plastic, pultruded shapes. For a detailed discussion of pultrusion technology, reference is directed to "Handbook of Pultrusion Technology" by Raymond W. Meyer, first published in 1985 by Chapman and Hall, New York. In the practice of the present invention, conductive carbon fibers are submersed in a polymer bath and drawn through a die opening of suitable shape at high temperature to produce a solid piece of dimensions and shapes of the die which can be cut, shaped and machined. As a result, thousands of conductive fiber elements are contained within the polymer matrix whose ends are exposed to surfaces to provide electrical contacts. This high degree of redundancy and availability of electronic point contacts enables a substantial improvement in the reliability of these devices. Since the plurality of small diameter conductive fibers are pulled through the polymer bath and heated die as a continuous length, the shaped member is formed with the fibers being continuous from One end of the member to the other and oriented within the resin matrix in a direction substantially parallel to the axial direction of the member. By the term "axial direction" it is intended to define in a lengthwise or longitudinal direction along the major axis of the configuration during the pultrusion process. Accordingly, the pultruded composite may be formed in a continuous length of the configuration during the pultrusion process and cut to any suitable dimension providing at each end a very large number of electrical point contacts. These pultruded composite members may have either one or both of the ends subsequently fibrillated.

Any suitable fiber may be used in the practice of the present invention. Typically, the conductive fibers are nonmetallic and have a DC volume resistivity of from about $1\times10^{-5}$ to about $1\times10^{10}$ ohm-era and preferably from about $1\times10^{-4}$ to about 10 ohm-cm to minimize resistance losses and suppress RFI. The upper range of resistivities of up to $1\times10^{10}$ ohm-cm. could be used, for example, in those special applications involving extremely high fiber densities where the individual fibers act as individual resistors in parallel thereby lowering the overall resistance of the pultruded member enabling current conduction. The vast majority of applications however, will require fibers having resistivities within the above stated preferred range to enable current conduction. The term "nonmetallic" is used to distinguish from conventional metal fibers which exhibit metallic conductivity having resistivity of the order of $1\times10^{-6}$ ohm-cm and to define a class of fibers which are nonmetallic but can be treated in ways to approach or provide metal like properties. Higher resistivity materials may be used if the input impedance of the associated electronic circuit is sufficiently high. In addition, the individual conductive fibers are generally circular in cross section and have a diameter generally in the order of from about 4 to about 50 micrometers and preferably from about 7 to 10 micrometers which provides a very high degree of redundancy in a small cross sectional area. The fibers are typically flexible and compatible with the polymer systems. Typical fibers include carbon and carbon/graphite fibers.

A particularly preferred fiber that may be used are those fibers that are obtained from the controlled heat treatment processing to yield complete or partial carbonization of polyacrylonitrile (PAN) precursor fibers. It has been found for such fibers that by carefully controlling the temperature of carbonization within certain limits that precise electrical resistivities for the carbonized carbon fibers may be obtained. The carbon fibers from polyacrylonitrile precursor fibers are commercially produced by the Stackpole Company, and Celion Carbon Fibers, Inc., division of BASF and others in yarn bundles of 1,000 to 160,000 filaments. The yarn bundles are carbonized in a two-stage process involving stabilizing the PAN fibers at temperatures of the order of 300° C. in an oxygen atmosphere to produce preox-stabilized PAN fibers followed by carbonization at elevated temperatures in an inert (nitrogen) atmosphere. The D.C. electrical resistivity of the resulting fibers is controlled by the selection of the temperature of carbonization. For example, carbon fibers having an electrical resistivity of from about $10^2$ to about $10^6$ ohms-cm are obtained if the carbonization temperature is controlled in the range of from about 500° C. to 750° C. while carbon fibers having D.C. resistivities of $10^{-2}$ to about $10^{-6}$ ohm-cm result from treatment temperatures of 1800° to 2000° C. For further reference to the processes that may be employed in making these carbonized fibers attention is directed to U.S. Pat. No. 4,761,709 to Ewing et al. and the literature sources cited therein at column 8. Typically these carbon fibers have a modulus of from about 30 million to 60 million psi or 205–411 GPa which is higher than most steels thereby enabling a very strong pultruded composite member. The high temperature conversion of the polyacrylonitrile fibers results in a fiber which is about 99.99% elemental carbon which is inert and will resist oxidation.

One of the advantages of using conductive carbon fibers is that they have a negative coefficient of thermal conductivity so that as the individual fibers become hotter with the passage of, for example, a spurrious high current surge, they become more conductive. This provides an advantage over metal contacts since metals operate in just the opposite manner and therefore metal contacts tend to burn out or self destruct. The carbon fibers have the further advantage in that their surfaces are inherently rough and porous thereby providing better adhesion to the polymer matrix. In addition, the inertness of the carbon material yields a contact surface relatively immune to contaminants of the plated metal.

Any suitable polymer matrix may be employed in the practice of the present invention. The polymer may be insulating or conducting. If cross directional electrical conduction is desired along the edges of the pultrusion a conducting polymer may be used. Conversely, if insulating properties are desired along the edges of the pultrusion, a thick layer of an insulating polymer may be used, or insulating fibers can be used in the outer periphery of the pultruded configuration and the conducting fibers can be configured to reside away from the edges.

Typically, the polymer is selected from the group of structural thermoplastic and thermosetting resins. Polyesters, epoxies, vinyl esters, polyetheretherketones, polyetherimides, polyethersulphones, polypropylene and nylon are in general, suitable materials with the polyesters and vinylesters being preferred due to their short cure time, relative chemical inertness and suitability for laser processing. If an elastomeric matrix is desired, a silicone, fluorosilicone or polyurethane elastomer may provide the polymer matrix. Typical specific materials include Hetron 613, Hetron 980, Arpol 7030 and 7362 available from Oshland Oil, Inc., Dion Iso 6315 available from Koppers Company, Inc. and Silmar S-7956 available from Vestron Corporation. For additional information on suitable resins, attention is directed to Chapter 4 of the above-referenced Handbook by Meyer. Other materials may be added to the polymer bath to provide their properties such as corrosion or flame resistance as desired. In addition, the polymer bath may contain fillers such as calcium carbonate, alumina, silica or pigments to provide a certain color or lubricants to reduce friction, for example, in sliding contacts. Further additives to alter the viscosity, surface tension or to assist in cross linking or in bonding the pultrusion to the other materials may be added. Naturally, if the fiber has a sizing applied to it, a compatible polymer should be selected. For example, if an epoxy resin is being used, it would be appropriate to add an epoxy sizing to the fiber to promote adhesion between the resin and the fibers.

The fiber loading in the polymer matrix depends upon the conductivity desired as well as on the cross sectional area and other mechanical properties of the final configuration. Typically, the resins have a specific gravity of from about 1.1 to about 1.5 while the fibers have a specific gravity of from about 1.7 to about 2.2. While the fibers may be present in amounts as low as 5% by weight of the pultruded component, in providing the levels of conductivity heretofore mentioned, typically the pultruded composite member is more than 50% by weight fiber and preferably more than 70 or even 90% fiber, the higher fiber loadings providing more fibers for contacts having low bulk resistivity and stiffer, stronger parts. In general to increase the conductivity of the matrix additional conductive fiber may be added.

The pultruded composite members may be prepared according to the pultrusion technique as described, for example, by Meyer in "Handbook of Pultrusion Technology". In general, this will involve the steps of prerinsing the continuous multi-filament strand of conductive carbon fibers in a pre-rinse bath followed by pulling the continuous strand through the molten or liquid polymer followed by pulling it through a heated die which may be at the curing temperature of the resin into an oven dryer if such is necessary to a cut-off or take-up position. For further and more complete details of the process attention is directed to Meyer. The desired final shape of the pultruded composite member may be that provided by the die. Typically, the cross section of the pultrusion may be round, oval, square, rectangular, triangular, etc. In some applications, it can be irregular in cross section or can be hollow like a tube or circle having the above shapes. Other configurations allowing mixed areas of conducting and non conducting fibers are also possible. The pultrusion is capable of being machined with conventional carbide tools according to standard machine shop practices. Typically, holes, slots, ridges, grooves, convex or concave contact areas or screw threads may be formed in the pultruded composite member by conventional machining techniques. Alternatively, the pultrusion process may be modified such that when the pultrusion is initially removed from the die it is pliable and can be bent or otherwise shaped to a form which upon further curing becomes a rigid structural member. Alternatively, if the pultrusion resin is a thermoplastic the process can be adjusted such that the part is removed hot from the die, shaped, then cooled to solidify.

Typically, the fibers are supplied as continuous filament yarns having, for example, 1, 3, 6, 12 or up to 160 thousand filaments per yarn. Typically the fibers provide in the formed pultruded member from about $1\times10^5$ (a nominal 4 micrometer diameter fiber at 90% by weight loading in the pultrusion) to about $1\times10^7$ (a nominal 4 micrometer diameter fiber at 90% by weight loading in the pultrusion) point contacts per $cm^2$.

The electronic component having the high redundancy electrical contact surface of individual fibrillated fibers may be fabricated from a pultruded member of suitable cross section with any suitable technique. Typical techniques for fibrillating the pultruded member include solvent and heat removal of the polymer matrix at the end of the pultruded member. In a preferred embodiment, fibrillation is carried out by exposure to a laser beam. In the heat removal processes the polymer matrix should have a significantly lower melting or decomposition point than the fibers. Similarly in solvent removal processes, the solvent should remove the polymer matrix only and be a nonsolvent for the fibers. In either case the removal should be substantially complete with no significant amount of residue remaining. Typically the pultruded member is supplied in a continuous length and is formed into a fibrillated contact of much smaller dimension so that the laser is used to both cut individual components from the longer length and at the same time fibrillate both severed ends providing a high redundancy fiber contact for the advanced pultruded member downstream and a high redundancy fiber contact on the upstream end of the second pultruded member. Typically, the lasers employed are those which the polymer matrix will absorb and thereby volatilize. They should also be safe, have high power for rapid cutting having either pulsed or continuous output and be relatively easy to operate. Specific lasers include a carbon dioxide laser, or a carbon monoxide laser, a YAG laser or an argon ion laser with the carbon dioxide laser preferred as it is highly reliable and best suited for polymer matrix absorption and to manufacturing environments and is most economical. The following example illustrates the invention.

Pultrusions in the shape of a rod 2.5 mm in diameter made from carbon fibers about 8 to 10 micrometers in diameter and having a resistivity of 0.001 to 0.1 ohm-cm present in a vinyl ester resin matrix to a density greater than 10,000 fibers per $mm^2$ were exposed to an (Adkin Model LPS50) laser focused to a 0.5 mm spot, 6 watts continuous wave while the rod was slowly rotated about the rod axis at about 1 revolution per second. After about 100 seconds of exposure in one step the laser cleanly cut the pultrusion and uniformly volatilized the vinyl ester binder resin up to a few millimeters from the filament end (of both pieces) leaving an "artist brush-like" tip connected to the rigid conducting pultrusion as shown in FIG. 1.

Using a larger $CO_2$ laser (Coherent General model Everlase 548) operating at 300 watts continuous wave and scanning at about 7.5 cm/min. a 1 mm diameter pultrusion made from the same materials was cut and fibrillated in less than one second.

Attention is directed to FIGS. 1A and 2A which illustrate a preferred embodiment of an electronic component according to the present invention having a laser fibrillated brush-like structure at one end of a pultruded composite member which provides a densely distributed filament contact with an electrically contacting surface. With the above-described continuous pultrusions it will be understood that the brush-like structures have a fiber density of at least 1000 fibers/mm$^2$ and indeed could have fiber densities in excess of 15,000/mm$^2$ to provide the high level of redundancy of electrical contact. It will be appreciated that such a level of fiber density is not capable of being accurately depicted in FIG. 1A, FIG. 1B, FIG. 2A and FIG. 2B. FIG. 1 and FIG. 2, however, do illustrate that the fibers of the brush-like member have a substantially uniform free fiber length and that there is a well defined controlled zone of demarcation between the pultruded section and the brush-like section which is enabled through the precision control of the laser.

FIG. 1, FIG. 1A and FIG. 1B also illustrate an electronic component wherein the fibers of the brush-like structure have a length much greater than five times the fiber diameter and are therefore generally resiliently flexible behaving elastically as a mass when deformed. This type of electronic component would find utility in those applications where it is desirable to have a contact of resiliently flexible fibers such as in a sliding contact such as, for example, the photoconductor grounding brush described earlier. In these contacts it should be noted that the individual fibers are so fine and resilient that they will stay in contact with another contacting surface and do not bounce nor disrupt contacts such as frequently may happen with traditional metallic contacts. Accordingly, they continue to function despite minor disruptions in the physical environment. This type of macro fibrillation is to be distinguished from the more micro fibrillation illustrated in FIG. 2, FIG. 2A and FIG. 2B wherein the fibers in the brush-like structure have a length shorter than about five times the fiber diameter and the terminating ends provide a relatively rigid and nondeformable contacting surface. With this component, there will be a minimal deflection of the individual components and they will therefore find utility in applications requiring stationary or nonsliding contacts such as in switches and microswitches. Nevertheless, they provide a highly reliable contact providing great redundancy of individual fibers defining the contacting surface. It is particularly important in this micro embodiment that a good zone of demarcation between the pultruded section and the brush-like structure be maintained to provide a uniform contact and mating face with the other surface. If there is not a good demarcation between these two zones and if there is no substantially uniform free-fiber length, different contact pressures will be present in the contacting surface thereby presenting a non-uniform surface to the other contact.

The term zone of demarcation is intended to define that portion of the heat affected zone between the fibrillated brush-like structure and the pultruded section in which a gradation of decomposed polymer and completed fibrillated fibers exists. In the heat affected zone a small volume of the pultrusion is raised substantially in temperature upon contact with the light induced heat produced by the laser. The heat spreads from the hot contact zone to the colder bulk of the material due to thermal conductivity of the material, energy in the laser spot and time of exposure. The temperature profile along the length of the pultrusion created during the dynamic heating results in a gradation of decomposed polymer in the zone of demarcation.

Any suitable free fiber length of a fibrillated pultrusion up to an inch or more may be used. However, free fiber length greater than about 5 millimeters becomes impractical as being too costly to both remove and waste the polymer matrix compared to other conventional assembly techniques for brush structures. For electrostatic and other electrical and electronic applications a free fiber length of from about 0.1 to about 3 millimeters is preferred. In the micro embodiment the fibrillated end feels like a solid to the touch because the fibers are too short to be distinguished. However, in the macro embodiment it feels like a fuzzy velour or artist's brush.

In making an electronic component according to the preferred embodiment, a laser beam is moved relative to the pultruded piece. This may be readily accomplished by holding the laser beam or the pultruded piece stationary while the other is moved relative to the stationary item or by simultaneously moving both the laser and work piece in a controlled programmed manner.

Attention is directed to FIG. 3 which schematically illustrates a manner in which the pultruded piece 40 is secured to table 42 which is rotatably mounted about the center axis 43 or a motor shaft (not shown) in the motor box 44. In addition, the table is movable in the XY plane by movement of worm gear 46 by another motor (not shown) in the motor box 44. The laser scanning carriage 48 has laser port 52 and is movable vertically by worm gear 56 and motor 58 and horizontally by worm gear 60 and motor 62. The movement of the table 42 and the scanning carriage 48 is controlled by a programmable controller 64.

The laser fibrillated pultruded member may be used to provide at least one of the contacting components in a device for conducting electrical current, the other contacting component being selected from conventional conductors and insulators. In addition or alternatively both of the contacts may be made from similar or dissimilar pultruded and fibrillated pultruded composite members. Alternatively, one contact may be a pultruded member but not fibrillated. One contact may be macro fibrillated and the other micro fibrillated. Furthermore, one or both of the contacts may provide a mechanical or structural function. For example, in addition to performing as a conductor of current for a connector the solid portions of a fibrillated pultruded member may also function as a mechanical member such as a bracket or other structural support or as a mechanical fastener for a crimp on a metal connector. A portion of a fibrillated pultruded member may provide mechanical features such as a guide rail or pin or stop member or as a rail for a scanning head to ride on and also provide a ground return path. Accordingly, functions can be combined and parts reduced and in fact a single piece can function as electronic contact, support piece for itself and an electrical connection.

Figure 4:
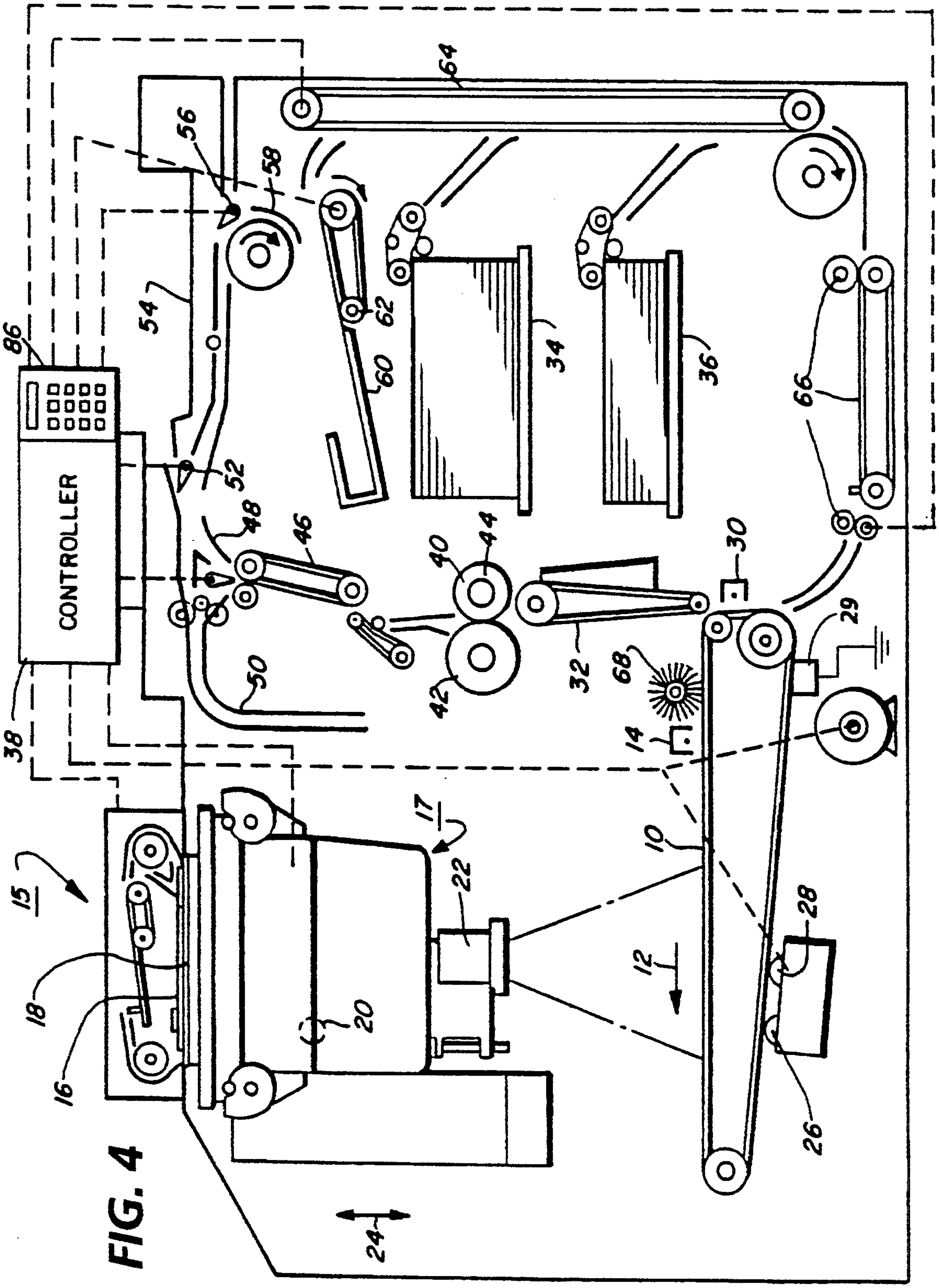
FIG. 4 is a representation in cross section of an automatic electrostatographic printing machine which may incorporate the present invention as a photoconductor grounding brush.

FIG. 4 illustrates an electrophotographic printing or reproduction machine employing a belt 10 having a photoconductive surface which has a grounding brush 29 according to the present invention. Belt 10 moves in the direction of arrow 12 to advance successive portions of the photoconductive surface through various processing stations, starting with a charging station including a corona generating device 14. The corona generating device charges the photoconductive surface to a relatively high substantially uniform potential.

The charged portion of the photoconductive surface is then advanced through an imaging station. At the imaging station, a document handling unit 15 positions an original document 16 facedown over exposure system 17. The exposure system 17 includes lamp 20 illuminating the document 16 positioned on transparent platen 18. The light rays reflected from document 16 are transmitted through lens 22 which focuses the light image of original document 16 onto the charged portion of the photoconductive surface of belt 10 to selectively dissipate the charge. This records an electrostatic latent image on the photoconductive surface corresponding to the information areas contained within the original document.

Platen 18 is mounted movably and arranged to move in the direction of arrows 24 to adjust the magnification of the original document being reproduced. Lens 22 moves in synchronism therewith so as to focus the light image of original document 16 onto the charged portion of the photoconductive surface of belt 10.

Document handling unit 15 sequentially feeds documents from a holding tray, seriatim, to platen 18. The document handling unit recirculates documents back to the stack supported on the tray. Thereafter, belt 10 advances the electrostatic latent image recorded on the photoconductive surface to a development station.

At the development station a pair of magnetic brush developer rollers 26 and 28 advance a developer material into contact with the electrostatic latent image. The latent image attracts toner particles from the carrier granules of the developer material to form a toner powder image on the photoconductive surface of belt 10.

After the electrostatic latent image recorded on the photoconductive surface of belt 10 is developed, belt 10 advances the toner powder image to the transfer station. At the transfer station a copy sheet is moved into contact with the toner powder image. The transfer station includes a corona generating device 30 which sprays ions onto the backside of the copy sheet. This attracts the toner powder image from the photoconductive surface of belt 10 to the sheet.

The copy sheets are fed from a selected one of trays 34 and 36 to the transfer station. After transfer, conveyor 32 advances the sheet to a fusing station. The fusing station includes a fuser assembly for permanently affixing the transferred powder image to the copy sheet. Preferably, fuser assembly 40 includes a heated fuser roller 42 and a backup roller 44 with the powder image contacting fuser roller 42.

After fusing, conveyor 46 transports the sheets to gate 48 which functions as an inverter selector. Depending upon the position of gate 48, the copy sheets will either be deflected into a sheet inverter 50 or bypass sheet inverter 50 and be fed directly onto a second gate 52. Decision gate 52 deflects the sheet directly into an output tray 54 or deflects the sheet into a transport path which carries them on without inversion to a third gate 56. Gate 56 either passes the sheets directly on without inversion into the output path of the copier, or deflects the sheets into a duplex inverter roll transport 58. Inverting transport 58 inverts and stacks the sheets to be duplexed in a duplex tray 60. Duplex tray 60 provides intermediate or buffer storage for those sheets which have been printed on one side for printing on the opposite side.

With reference to FIG. 5, there is shown in a path of movement of a document 16 document sensor 66. The document sensor 66 generally includes a pair of oppositely disposed conductive contacts. One such pair is illustrated as a laser fibrillated brush 68 carried in upper support 70 in electrical contact with pultruded composite member 72 carried in lower conductive support 74. The pultruded composite member comprises a plurality of conductive fibers 71 in a polymer matrix 75 having surface 73 with the one end of the fibers being available for contact with the fibers of the laser fibrillated brush 68 which is mounted transversely to the sheet path to contact and be deflected by passage of a document between the contacts. When no document is present, the laser fibrillated brush fibers form a closed electrical circuit with the surface 73 of the pultruded member 72.

Attention is directed to FIG. 6 wherein a side view schematic of a photoconductor grounding brush is illustrated with the photoconductor moving in the direction indicated by the arrow. A notch or "V" is formed in the pultruded portion of the grounding brush since the moving photoconductor belt can have a seam across the belt which would otherwise potentially disrupt the grounding operation. This geometry provides two fibrillated brush-like structures which are separated by the space of the notch or "V".

A pultrusion having the view from the side illustrated in FIG. 6 about 17 mm long, 25 mm wide and 0.8 mm thick was tested as a photoconductor grounding brush in a Xerox 5090 duplicator. The pultrusion was made from 50 yarns of 6000 filaments each Celion Carbon Fiber G30-500 yarn (available from Celion Carbon Fibers Div., BASF Structural Materials Inc., Charlotte, N.C.) which were epoxy sized and pultruded into a vinyl ester binder resin. The pultruded member was cut at 17 mm intervals by a $CO_2$ laser which simultaneously fibrillated both edges of the cut. A mechanical notcher was used to make the "V" as illustrated in FIG. 6. Two so formed brush-like structures were mounted in Xerox 5090 duplicators so that the brushes were in grounding contact with the edge of the photoconductor. The other end of the pultrusion was connected to a wire to machine ground. In both machines more than 15 million copies were produced without failure where loss of fibers would typically cause shorting of other components when the test was interrupted.

Thus, according to the present invention an electronic component having a densely distributed filament contact providing a very high redundancy of available point contacts is provided which is orders of magnitude greater than conventional metal to metal contacts. Further, a highly reliable low cost, long wearing component that can be designed for serviceability which can be of controlled resistance, immune to contamination, non toxic, and environmentally stable has been provided. It is capable of functioning for very extended periods of time in low energy configurations. In addition, in the preferred embodiment the pultruded member can be cut into individual contacts and simultaneously fibrillated to provide a finished contact whose free fiber length can be closely controlled and the zone of demarcation between the pultruded portion and its free fibers well defined because the laser can be precisely controlled and focused in a programmable manner. Furthermore in addition to being capable of one step automated manufacturing the component can combine electrical function with mechanical or structural function.

The disclosures of the cross referenced applications, patents and the other references including the Meyer book and Holm book referred to herein are hereby specifically cross referenced and totally incorporated herein by reference.

While the invention has been described with reference to specific embodiments, it will be apparent to those skilled in the art that many alternatives, modifications and variations may be made. For example, while the invention has been generally illustrated for use in electrostatographic printing apparatus, it will be appreciated that it has equal application to a larger array of machines with electrical components.

Furthermore, while the preferred embodiment has been described with reference to a one step laser cut and fibrillating process, it will be understood that the cutting and fibrillating steps may be performed separately and in succession. Accordingly, it is intended to embrace all such alternative modifications as may fall within the spirit and scope of the appended claims.

We claim:

1. A method for making an electronic component comprising providing a nonmetallic pultruded composite member having a plurality of small diameter conductive fibers in .a polymer matrix said plurality of fibers being oriented in said matrix in a direction substantially parallel to the axial direction of said member and being continuous from one end of said member to the other to provide a plurality of electrical point contacts at each end of said member, directing, a laser beam to one end of said member, controlling said laser beam to volatilize the polymer matrix at said one end and expose the plurality of conductive fibers to provide a laser fibrillated brush-like structure having a densely distributed filament contact wherein the terminating ends of the fibers in the brush-like structure define an electrically contacting surface.

2. The method of claim 1 wherein said pultruded member is an elongated member and wherein said laser beam is controlled to cut through the pultruded member adjacent said one end.

3. The method of claim 2 wherein said laser beam is controlled to simultaneously cut the pultrusion and volatilize the polymer matrix.

4. The method of claim 1 wherein said beam is from a focused carbon dioxide laser.

5. The method of claim 1 wherein said laser beam is controlled to provide the fibers of said brush-like structure with a substantially uniform free fiber length.

6. The method of claim 1 wherein said laser beam is controlled to provide a well defined zone of demarcation between the pultruded potion and the brush-like structure.

7. The method of claim 1 wherein said polymer matrix absorbs the energy of the fibrillating laser.

8. The method of claim 5 wherein said fibers have a length less than about 3 millimeters.

9. The method of claim 1 wherein said conductive fibers are carbon fibers.

10. The method of claim 9 wherein said carbon fibers are carbonized polyacrylonitrile fibers.

11. The method of claim 1 wherein the fibers are generally circular in cross section and have a diameter of from about 4 micrometers to about 50 micrometers.

12. The method of claim 11 wherein the fibers have a diameter of from about 7 micrometers to about 10 micrometers.

13. The method of claim 1 wherein the fibers have a DC volume resistivity of from about $1\times10^{-5}$ ohm-cm to about $1\times10^{10}$ ohm-cm.

14. The method of claim 13 wherein the fibers have a DC volume resistivity of from about $1\times10^{-4}$ ohm-cm to about 10 ohm-cm.

15. The method of claim 1 wherein said fibers comprise at least 5% by weight of the component.

16. The method of claim 15 wherein said fibers comprise at least 50% by weight of the component.

17. The method of claim 16 wherein said fibers comprise about 90% by weight of the component.

18. The method of claim 1 wherein said polymer matrix is a structural thermoplastic or thermosetting resin.

19. The method of claim 18 wherein said resin is a polyester, vinylester or epoxy.

20. The method of claim 18 wherein said polymer is a crosslinked silicone elastomer.

21. The method of claim 1 wherein said brush-like structure has a fiber density of at least 1000 fibers per square millimeter.

22. The method of claim 21 wherein said brush-like structure has a fiber density of at least 15,000 fibers per square millimeter.

23. The method of claim 1 wherein the fibers in the brush-like structure have a length greater than five times the fiber diameter and are resiliently flexible behaving elastically as a mass when deformed.

24. The method of claim 1 wherein the fibers in the brush-like structure have a length shorter than five times the fiber diameter and the terminating ends provide a relatively rigid contacting surface.

* * * * *